(12) United States Patent
Elshaer

(10) Patent No.: US 12,485,767 B2
(45) Date of Patent: Dec. 2, 2025

(54) BATTERY CURRENT CONTROL MODULE WITH DUAL DC VOLTAGE OUTPUT

(71) Applicant: Ford Global Technologies, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 71 days.

(21) Appl. No.: 18/535,402

(22) Filed: Dec. 11, 2023

(65) Prior Publication Data

US 2025/0187448 A1 Jun. 12, 2025

(51) Int. Cl.
| | |
|---|---|
| *B60L 15/00* | (2006.01) |
| *B60L 50/60* | (2019.01) |
| *B60L 53/22* | (2019.01) |
| *H02J 7/02* | (2016.01) |
| *H02P 27/06* | (2006.01) |
| *B60L 58/12* | (2019.01) |

(52) U.S. Cl.
CPC ............ *B60L 15/007* (2013.01); *B60L 50/60* (2019.02); *B60L 53/22* (2019.02); *H02J 7/02* (2013.01); *H02P 27/06* (2013.01); *B60L 58/12* (2019.02); *B60L 2210/30* (2013.01); *H02J 2207/20* (2020.01)

(58) Field of Classification Search
CPC ........ B60L 15/007; B60L 50/60; B60L 53/22; B60L 58/12; B60L 2210/30; B60L 58/20; B60L 2210/10; H02J 7/02; H02J 2207/20; H02P 27/06
USPC ................... 307/9.1, 10.1, 19; 320/107, 109
See application file for complete search history.

(56) References Cited

U.S. PATENT DOCUMENTS

| | | | |
|---|---|---|---|
| 2017/0282747 A1 | 10/2017 | Wang | |
| 2021/0408889 A1* | 12/2021 | Zhu | ........................ B60L 15/007 |
| 2022/0286057 A1* | 9/2022 | Zhang | ..................... B60L 58/20 |

FOREIGN PATENT DOCUMENTS

| | | |
|---|---|---|
| JP | 2020527321 A | 9/2020 |
| KR | 20210050555 A | 5/2021 |

* cited by examiner

*Primary Examiner* — Elim Ortiz
(74) *Attorney, Agent, or Firm* — David B. Kelley; Brooks Kushman P.C.

(57) ABSTRACT

A circuit arrangement includes an AC/DC power converter, a transformer connected between a second switching bridge and the AC/DC power converter, a third switching bridge connected between the AC/DC power converter and transformer, a first switch bank connected between a first switching bridge and the transformer such that operation of the first switch bank selectively disconnects the first switching bridge from the circuit arrangement without disconnecting the second switching bridge from the circuit arrangement, and a second switch bank connected between the AC/DC power converter and a traction battery.

13 Claims, 5 Drawing Sheets

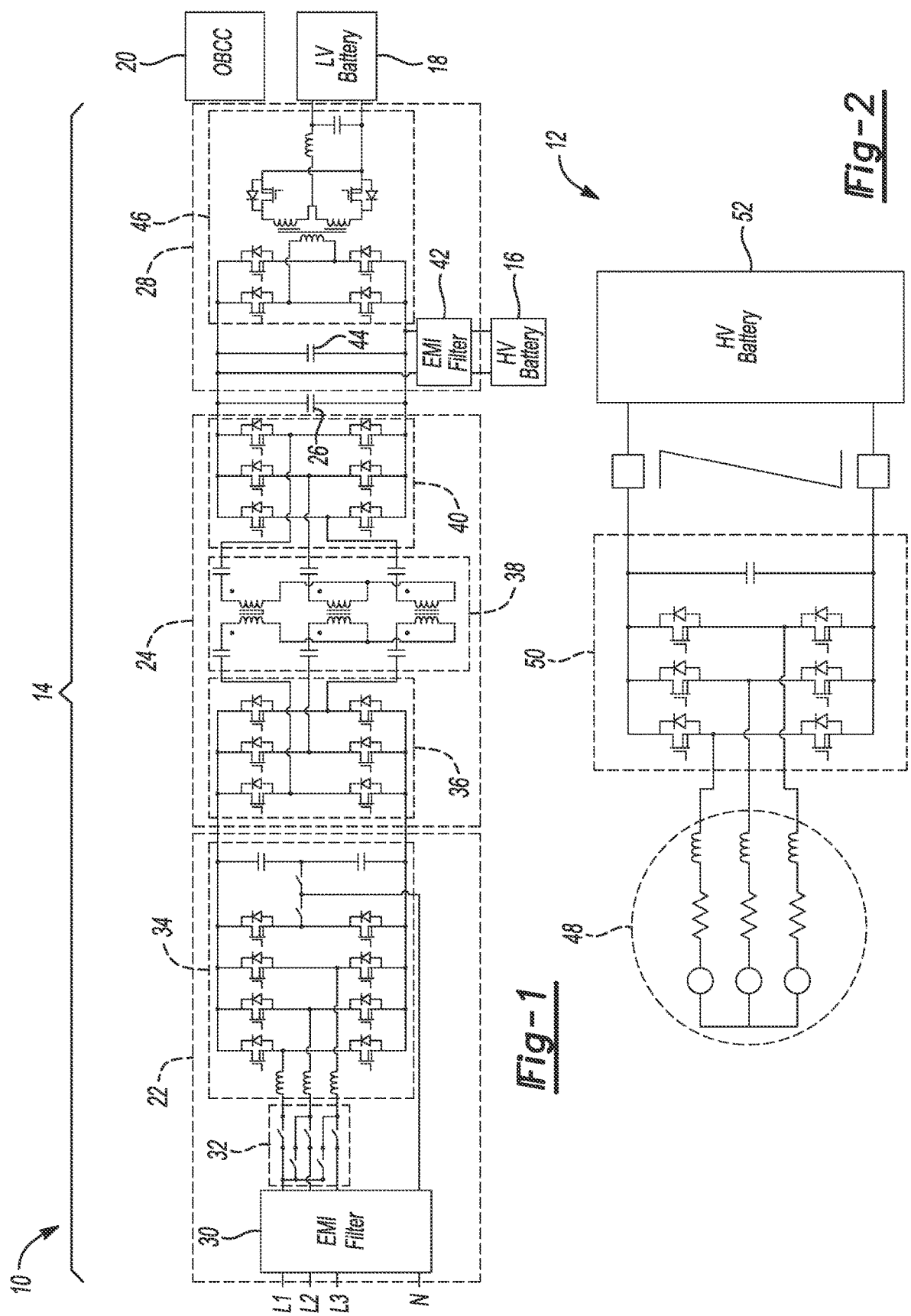

BATTERY CURRENT CONTROL MODULE WITH DUAL DC VOLTAGE OUTPUT

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store electrical energy.

SUMMARY

An automotive power system comprises first and second switching bridges and a circuit arrangement. The circuit arrangement includes an AC/DC power converter, a transformer connected between the second switching bridge and AC/DC power converter, a third switching bridge connected between the AC/DC power converter and transformer, a first switch bank connected between the first switching bridge and transformer such that operation of the first switch bank selectively disconnects the first switching bridge from the circuit arrangement without disconnecting the second switching bridge from the circuit arrangement, and a second switch bank connected between the AC/DC power converter and a traction battery.

A method for operating a traction battery, first and second switching bridges, and a circuit arrangement including an AC/DC power converter, a transformer connected between the second switching bridge and AC/DC power converter, a third switching bridge connected between the AC/DC power converter and transformer, a first switch bank connected between the first switching bridge and transformer, and a second switch bank connected between the AC/DC power converter and traction battery, comprises during a drive mode, configuring the first and second switch banks to permit power flow from the traction battery to the second switching bridge via the transformer.

A vehicle comprises an electric machine, a traction battery, a first switching bridge connected between the electric machine and traction battery, and a circuit arrangement including a second switching bridge, an AC/DC power converter, a transformer connected between the second switching bridge and AC/DC power converter, a third switching bridge connected between the AC/DC power converter and transformer, a first switch bank connected between the first switching bridge and transformer, and a second switch bank connected between the AC/DC power converter and traction battery. The vehicle also comprises a controller that, during a drive mode, configures the first and second switch banks to permit power flow from the traction battery to the second switching bridge via the transformer.

BRIEF DESCRIPTION OF THE DRAWINGS

FIG. 1 is a schematic diagram of a system including a battery current control module.

FIG. 2 is a schematic diagram of a system including an inverter system controller.

DETAILED DESCRIPTION

Figure 3:
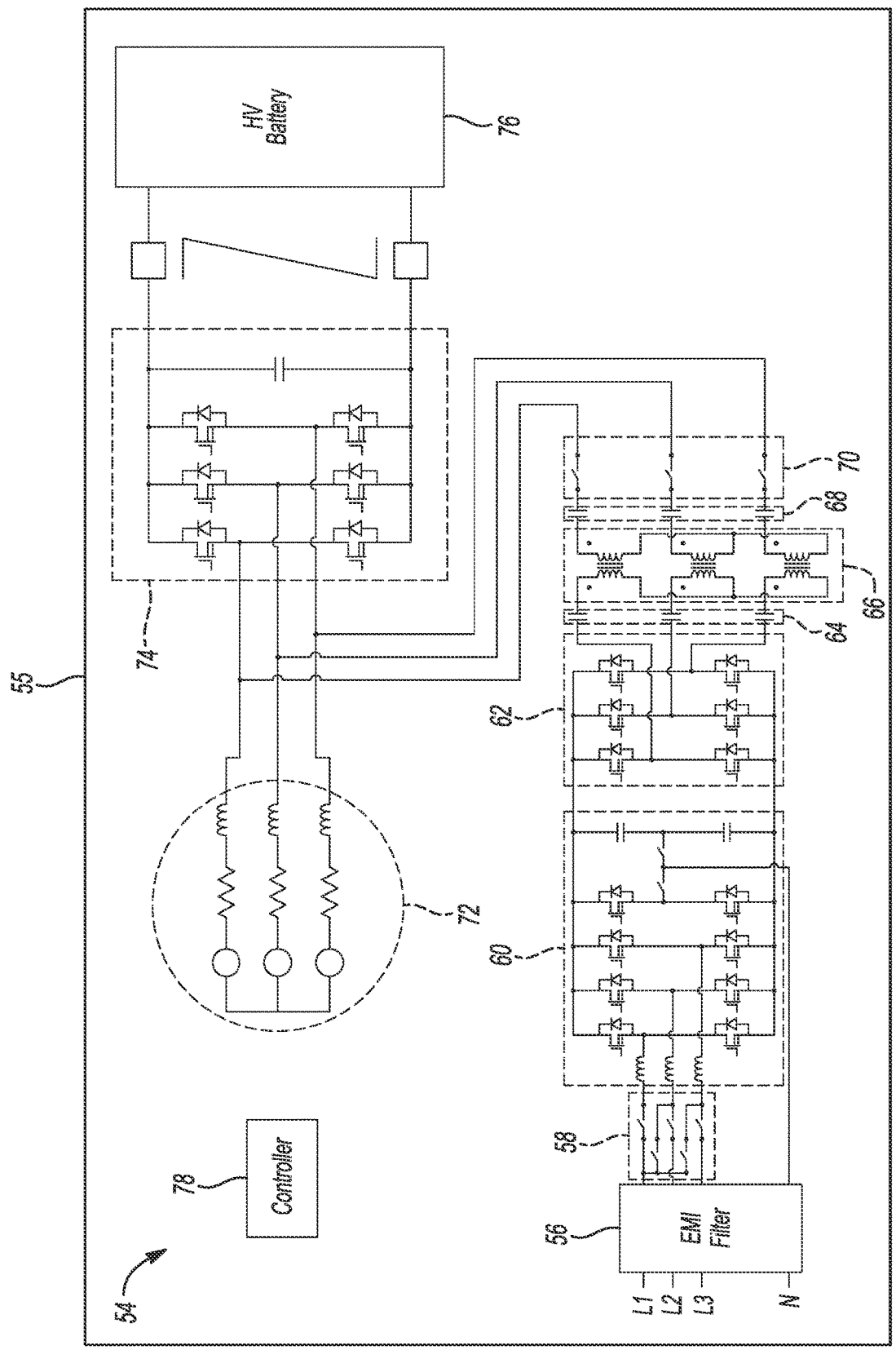
FIG. 3 is a schematic diagram of a system including an integrated battery current control module and inverter system controller.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery current control modules (BCCMs) are components in automotive vehicles, particularly those with electric or hybrid powertrains. These modules play a role in managing the flow of electric current to and from the battery. BCCMs function as control units that interface between the battery, the charging system, and the electrical loads. They monitor and control various parameters such as battery state of charge, voltage, and temperature, and based on this information, they manage the flow of current to the battery. BCCMs may facilitate charging control by overseeing the charging process of the battery, and managing the voltage and current supplied by the charging system. By monitoring the battery's state of charge and adjusting the charging parameters accordingly, BCCMs attempt to ensure the battery receives the appropriate level of charge to maintain performance. Similarly, BCCMs may be responsible for discharging control. They can manage the current output from the battery to the electrical loads in the vehicle. By controlling the current flow, BCCMs may ensure a controlled supply of power to the various electrical components and systems. BCCMs may also implement various measures for the battery. For instance, they may monitor battery temperature to prevent overheating. They may also detect overvoltage or undervoltage situations and implement measures to preclude short circuits or excessive current draw. BCCMs may feature diagnostic capabilities. These modules can monitor the health and performance of the battery system. They can log codes and provide diagnostic information, facilitating maintenance.

Communication interfaces are often incorporated into BCCMs. These interfaces, such as Controller Area Network (CAN) or LIN (Local Interconnect Network), allow BCCMs to exchange information with other vehicle systems, including the engine control unit or the body control module. This enables coordinated operation and integrated control across various vehicle functions. BCCMs can receive commands or instructions from other control units and adjust current flow accordingly.

Inverter system controllers (ISCs) are also components in automotive vehicles with electric powertrains. They play a role in managing and controlling the power flow between the battery and electric motor. A function of an inverter system controller is to convert direct current (DC) from the battery into alternating current (AC) to power the electric motor. ISCs may act as a decision maker for the power electronics system. It may monitor various parameters such as motor speed, torque, and temperature to ensure operation. A task of ISCs is to convert DC power from the battery into three-phase AC power suitable for the electric motor. It may utilize high-power semiconductor devices, for example insulated-gate bipolar transistors (IGBTs), to control the switching of current and voltage. By modulating the pulse width and frequency of the AC waveform, the inverter system controller manages the speed and torque output of the electric motor. ISCs may provide control over the electric motor. They may use algorithms and control strategies to manage motor speed, torque, and direction of rotation. By adjusting the switching patterns of the IGBTs, the controller can vary the frequency and amplitude of the AC waveform, altering motor operation. ISCs can facilitate regenerative braking. During slowing or braking, the electric motor operates as a generator, converting the vehicle's kinetic energy into electrical energy. The inverter system controller may control the flow of energy, directing it back to the battery for storage. ISCs may be responsible for managing the thermal conditions of the power electronics system. They may monitor the temperature of the inverter and electric motor, and employ cooling systems such as fans, liquid cooling, or heat sinks to dissipate excess heat and maintain operating temperatures. ISCs may incorporate diagnostic capabilities to detect and protect against faults in the power electronics system. They may monitor various parameters such as voltage, current, and temperature values that could indicate a potential fault. If a fault is detected, the controller may take corrective actions such as shutting down the system, activating other measures, or providing fault codes for diagnostic purposes. ISCs may incorporate features such as overvoltage and undervoltage monitoring, overcurrent monitoring, and isolation monitoring.

ISCs often feature communication interfaces such as CAN or Ethernet, enabling integration with other vehicle systems. They may exchange information with the main control unit, enabling coordinated operation and facilitating diagnostics and troubleshooting. Communication interfaces also allow the controller to receive commands or instructions from the electronic control unit and adjust the power output accordingly.

Integrating the BCCM with the ISC is conventionally considered a challenge due to the disconnecting circuitry. The schematics of typical separate systems 10, 12 are shown in FIGS. 1 and 2, respectively.

Referring to FIG. 1, the system 10 includes a BCCM 14, a traction battery 16, an auxiliary battery 18, and an onboard charge controller 20. The BCCM includes an AC/DC power factor correction circuit 22, an isolated high voltage DC/DC circuit 24, a link capacitor 26, and an isolated high voltage to low voltage DC/DC circuit 28. The isolated high voltage DC/DC circuit 24 is connected between the AC/DC power factor correction circuit 22 and link capacitor 26. The link capacitor 26 is connected between the isolated high voltage DC/DC circuit 24 and the isolated high voltage to low voltage DC/DC circuit 28. The traction battery 16 and auxiliary battery 18 are connected with the isolated high voltage to low voltage DC/DC circuit 28.

The AC/DC power factor correction circuit 22 includes an electro-magnetic interference filter 30, a switch bank 32, and AC/DC power converter circuitry 34. The switch bank 32 is connected between the electro-magnetic interference filter 30 and AC/DC power converter circuitry 34.

The isolated high voltage DC/DC circuit 24 includes a first switching bridge 36, a transformer 38, and a second switching bridge 40. The first switching bridge 36 is directly connected with the power converter circuitry 34. The transformer 38 is connected between the first and second switching bridges 36, 40.

The isolated high voltage to low voltage DC/DC circuit 28 includes an electro-magnetic interference filter 42, a capacitor 44, and high voltage to low voltage power converter circuitry 46. The electro-magnetic interference filter 42 is connected across the capacitor 44 and directly connected to the traction battery 16. The capacitor 44 is connected between the link capacitor 26 and high voltage to low voltage power converter circuitry 46. The high voltage to low voltage power converter circuitry 46 is directly connected to the auxiliary battery 18. The onboard charge controller 20 is in communication with and/or exerts control over the components illustrated in FIG. 1.

Referring to FIG. 2, the system 12 includes an electric machine 48, an ISC 50, and a traction battery 52. The ISC 50 is connected between the electric machine 48 and traction battery 52.

The ISC 50 has a three-phase inverter designed to drive the electric machine 48 and operates at much higher power than the BCCM 14. The BCCM 14 also has three circuits configured as a three-phase inverter/rectifier. Two disconnect circuits are required to utilize the ISC's three-phase inverter in charging/discharging the traction battery 16. The first disconnect circuit is used to disconnect the electric motor 48 from the ISC 50, and the second disconnect is used to disconnect the ISC 50 from the traction battery 52. The contactors used in these disconnect circuits must carry the ISC's full current. Adding these contactors increases bill of material counts—making electric level integration unfavorable. Package level integration, however, can provide advantages since it reduces the overall package size and/or weight, and the number of connectors and wires. A new circuit topology is proposed that addresses some of the disconnect circuitry's issues. The schematics of such a system 54 is shown in FIG. 3 within the context of vehicle 55.

Referring to FIG. 3, the system 54 includes an electro-magnetic interference filter 56, a switch bank 58, an AC/DC power converter 60, a switching bridge 62, a capacitor bank 64, a transformer 66, a capacitor bank 68, a switch bank 70, an electric machine 72 a switching bridge 74, a traction battery 76, and a controller 78.

The switch bank 58 is connected between the electro-magnetic interference filter 56 and AC/DC power converter 60. The switching bridge 62 is connected between the AC/DC power converter 60 and capacitor bank 64. The transformer 66 is connected between the capacitor banks 64, 68. The capacitor bank 68 is connected between the transformer and switch bank 70. The transformer 66 is thus also connected between the switching bridge 62 and switch bank 70. The switching bridge 74 is connected between the electric machine 72 and traction battery 76. The controller 78 is in communication with and/or exerts control over the components illustrated in FIG. 3.

The switch bank 70 is connected with a secondary side of the transformer 66: When switches of the switch bank 70 are closed, the transformer 66 is connected between the electric machine 72 and switching bridge 74 such that the switching bridge 62, transformer 66, electric machine 72, and switching bridge 74 form an isolated DC/DC power converter. The controller 78 may close the switches of the switch bank 70 responsive to a request to charge the traction battery 76. When closed energy received from, for example, a grid received at the electro-magnetic interference filter 56 via L1, L2, L3, and N may be conditioned and transferred through the now formed isolated DC/DC power converter to the traction battery 76. The controller 78 may operate switches of the AC/DC power converter 60 and switching bridges 62, 64, for example, at 300 kHz when the switches of the switch bank 70 are closed (i.e., during charge mode.) When the charge is complete, the controller 78 may open the switches of the switch bank 70. The controller 78 may operate the switches of the switching bridge 64, for example, at 30 kHz (or less) when the switches of the switch bank 70 are open (e.g., during drive mode). Other switch speeds, of course, may be used.

The circuit topology presented in FIG. 3 allows for integrating a BCCM (the electro-magnetic interference filter 56, switch bank 58, AC/DC power converter 60, switching bridge 62, capacitor bank 64, transformer 66, capacitor bank 68, and switch bank 70) with an ISC without using high current contractors. The add-on circuitry is interfaced directly with the ISC without disconnecting the electric machine or traction battery. The add-on circuitry includes a front-end AC/DC power factor correction circuit and portions of the isolated high voltage DC/DC circuit that is part of the BCCM. Three relays are added for disconnecting the add-on circuitry from the ISC during drive mode. The BCCM's high voltage DC/DC circuit can be designed considering the electric machine's stator winding impedance and its variations with respect to rotor position. When the vehicle is plugged into the AC grid, the add-on circuitry, ISC, and electric motor form a bi-directional AC/DC-DC/AC power converter. The BCCM's high voltage DC/DC power converter can be designed to switch at a frequency much higher than the ISC's switching frequency.

Figure 4:
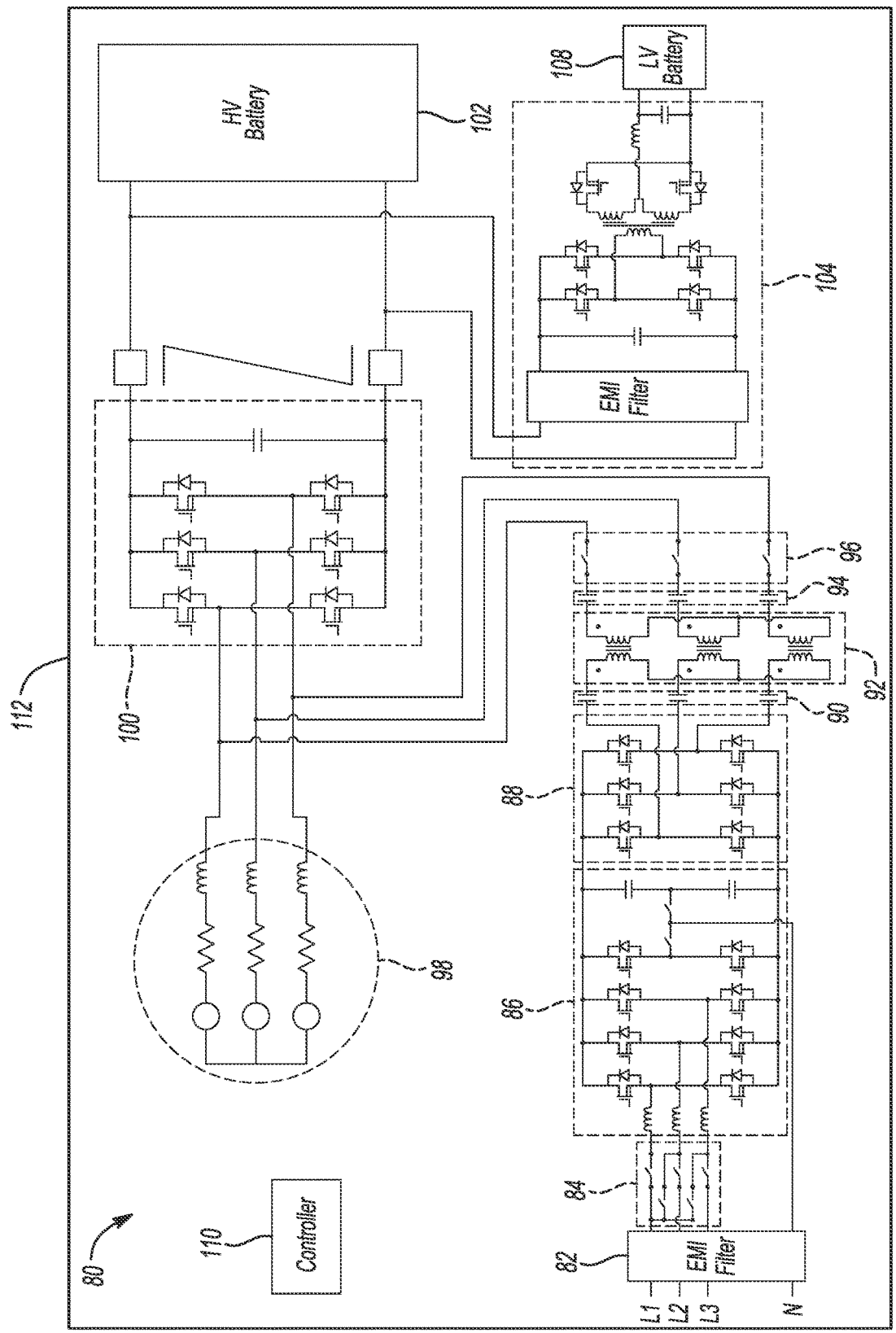
FIG. 4 is a schematic diagram of a system including an integrated battery current control module, inverter system controller, and high voltage to low voltage DC/DC converter.

Referring to FIG. 4, a system 80 includes an electro-magnetic interference filter 82, a switch bank 84, an AC/DC power converter 86, a switching bridge 88, a capacitor bank 90, a transformer 92, a capacitor bank 94, a switch bank 96, an electric machine 98, a switching bridge 100, a traction battery 102, a high voltage to low voltage DC/DC power converter 104, an auxiliary battery 106, and a controller 110. These components are shown within the context of vehicle 112. The controller 110 is in communication with and/or exerts control over the components illustrated in FIG. 4.

The electro-magnetic interference filter 82, switch bank 84, AC/DC power converter 86, switching bridge 88, capacitor bank 90, transformer 92, capacitor bank 94, switch bank 96, electric machine 98, switching bridge 100, and traction battery 102 are arranged, and can be operated by the controller 110, in a manner similar to FIG. 3.

The high voltage to low voltage DC/DC power convert 104 is connected between the switching bridge 100 and traction battery 102. It is further connected with the auxiliary battery 108 such that, when the high voltage to low voltage DC/DC power converter 104 is operating, power from the switching bridge 100 may flow through the high voltage to low voltage DC/DC power converter 104 to the auxiliary battery 108.

Integrating the BCCM with the inverter system controller is estimated to increase the ISC's package size by 50%. With a larger package size, the module's location may be constrained. Hence, there is a need to reduce packaging size.

The high voltage to low voltage DC/DC power converter 104 contributes to the required packaging space. In some arrangements, the high voltage circuit of the high voltage to low voltage DC/DC power converter 104 consumes almost half of its overall size. The following topology eliminates the high voltage circuit.

Figure 5:
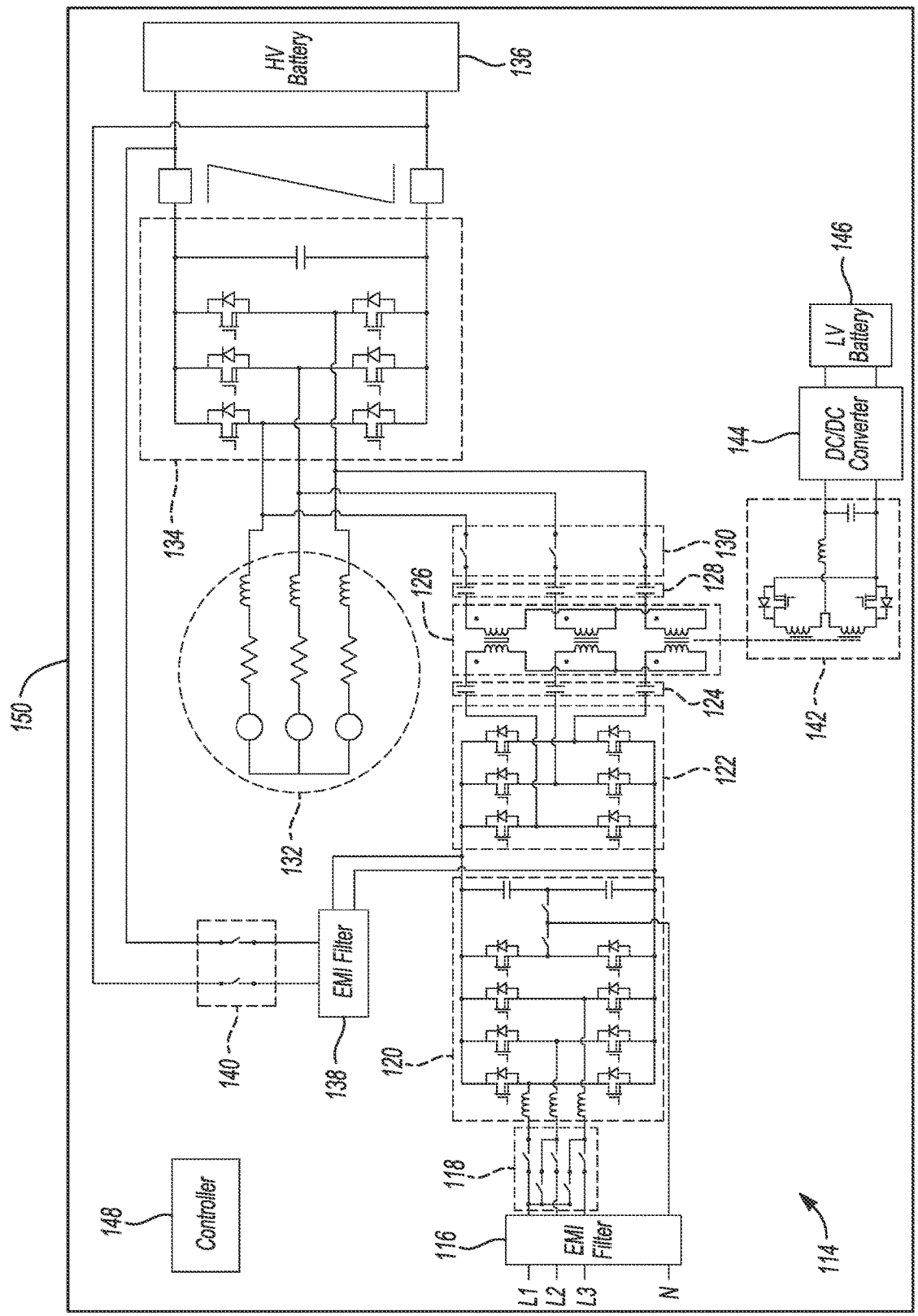
FIG. 5 is a schematic diagram of a system including an integrated battery current control module, inverter system controller, rectifier, and DC/DC converter.

Referring to FIG. 5, a system 114 includes an electro-magnetic interference filter 116, a switch bank 118, an AC/DC power converter 120, a switching bridge 122, a capacitor bank 124, a transformer 126, a capacitor bank 128, a switch bank 130, an electric machine 132, a switching bridge 134, a traction battery 136, an electro-magnetic interference filter 138, a switch bank 140, a rectifier 142, a DC/DC power converter 144, an auxiliary battery 146, and a controller 148. These components are shown within the context of vehicle 150. The controller 148 is in communication with and/or exerts control over the components illustrated in FIG. 5.

The electro-magnetic interference filter 116, switch bank 118, AC/DC power converter 120, switching bridge 122, capacitor bank 124, transformer 126, capacitor bank 128, switch bank 130, electric machine 132, switching bridge 134, and traction battery 136 are arranged in, and can be operated by the controller 148, in a manner similar to FIGS. 3 and 4.

The electro-magnetic interference filter 138 is directly connected between the AC/DC power converter 120 and switch bank 122. The switch bank 140 is arranged to connect the electro-magnetic interference filter 138 directly with the traction battery 136 such that power output from the AC/DC power converter 120 may flow directly to the traction battery 136 via the electro-magnetic interference filter 138 and switch bank 140.

The rectifier 142 is magnetically coupled with the transformer 126 via a low voltage coil and common core. The DC/DC power converter 144 is connected between the rectifier 142 and auxiliary battery 146 such that power from the transformer 142 may flow through the rectifier 142 and DC/DC power converter 144 to the auxiliary battery 146. The DC/DC power converter 144 may provide additional power management to the auxiliary battery 146.

The rectifier 142 may be implemented as a center-tap rectifier, a full-bridge rectifier, a half-bridge rectifier, a current doubler, etc. The low voltage coil can be implemented as a center-tap coil or single coil. The rectifier 142 rectifies the voltage induced across the low voltage coil for delivering DC power to the auxiliary battery 146.

As alluded to above, the switch bank 140 electrically connects the traction battery 136 to the BCCM's intermediate DC bus. When the vehicle 150 is disconnected from the AC grid or is in drive mode, all other relays, including the switch bank 130, are open. The BCCM's intermediate DC bus is energized by closing the switch bank 140. An isolated high voltage to low voltage DC/DC power converter is configured for charging the auxiliary battery 146. The transformer's primary windings and low voltage coil are energized for charging/discharging the auxiliary battery 146.

When the vehicle 150 is connected to the AC grid, the controller 148 generates commands such that the switch bank 140 is open, and the switch bank 130 is closed. The switch bank 118 is configured depending on grid type (e.g., single-phase, two-phase, three-phase, etc.). All transformer windings are energized to allow for bidirectional power flow between the AC grid and the traction battery 136, and between the traction battery 136 and auxiliary battery 146.

Vehicle platforms that are powered by an 800V traction battery but include a 400V DC bus for powering certain loads and require interfacing to a range extender auxiliary battery need two additional DC-DC converters: A non-isolated DC-DC converter and an isolated DC-DC converter. Adding two additional modules to serve these functions may be challenging.

The integrated ISC-BCCM system can be modified to function as two separate DC/DC converters when the vehicle is disconnected from the AC grid. The system presented in FIG. 5 uses the ISC as a rectifier when charging the traction battery 136 from the AC grid (by closing the switch bank 130 and opening the switch bank 140). During drive mode, the switch bank 130 is open, and the switch bank 140 is closed to disconnect the BCCM's circuit from the ISC and connect the traction battery 136 to the intermediate DC bus. Powering the auxiliary battery 146 requires closing the switch bank 140. Traction battery voltage is applied across the BCCM's intermediate DC bus for energizing the transformer's primary windings. Power is thus coupled between the transformer's primary windings and secondary low voltage coil for charging the auxiliary battery 146.

Figure 6:
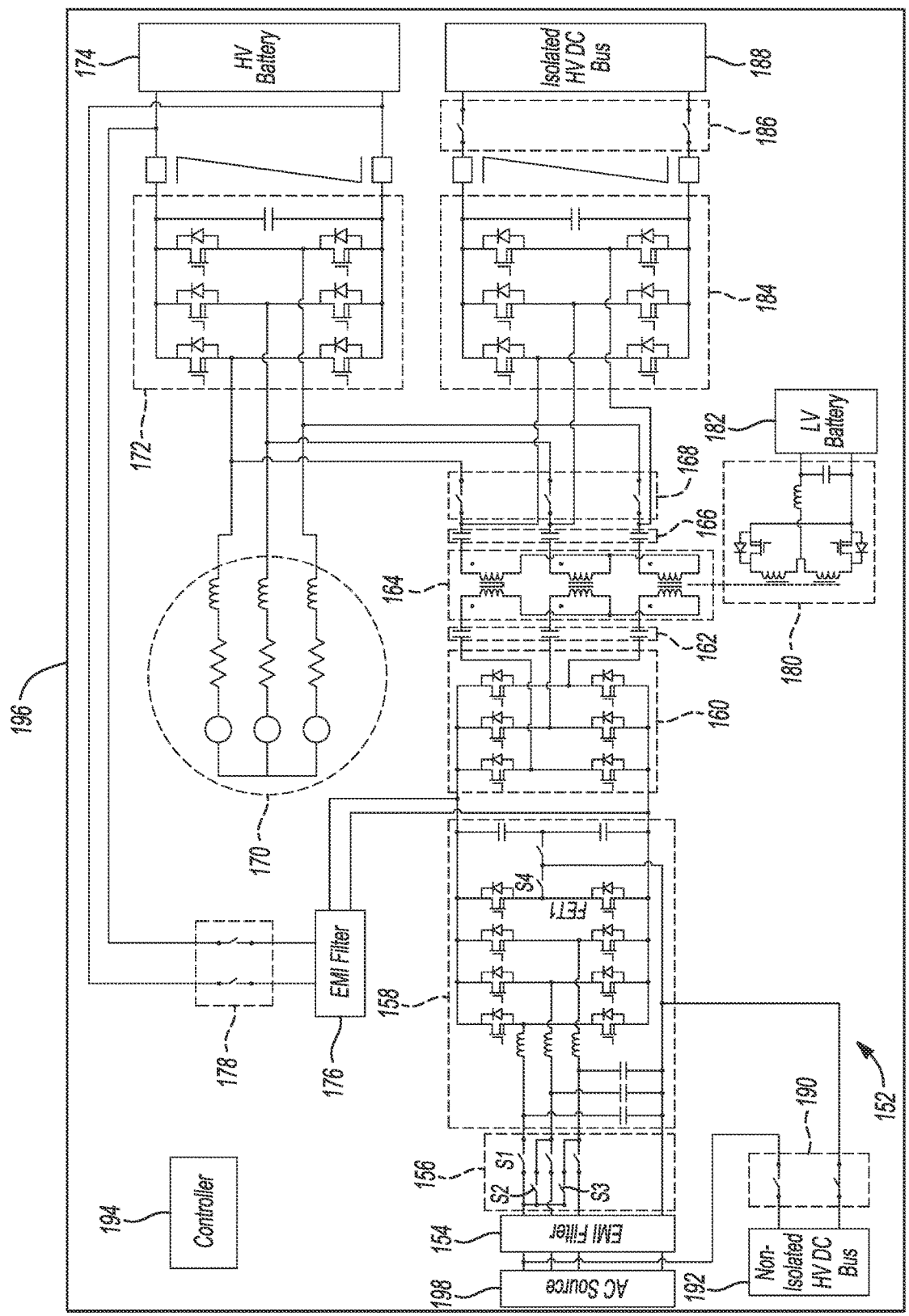
FIG. 6 is a schematic diagram of a system including an integrated battery current control module, inverter system controller, rectifier, and DC/DC converter divided into an isolated DC/DC converter and a non-isolated DC/DC converter.

Referring to FIG. 6, a system 152 includes an electro-magnetic interference filter 154, a switch bank 156, an AC/DC power converter 158, a switching bridge 160, a capacitor bank 162, a transformer 164, a capacitor bank 166, a switch bank 168, an electric machine 170, a switching bridge 172, a traction battery 174, an electro-magnetic interference filter 176, a switch bank 178, a rectifier 180, an auxiliary battery 182, a switching bank 184, a switch bank 186, an isolated high voltage DC bus 188, a switch bank 190, a non-isolated high voltage DC bus 192, and a controller 194. These components are shown within the context of vehicle 196. The controller 194 is in communication with and/or exerts control over the components illustrated in FIG. 6.

The electro-magnetic interference filter 154, switch bank 156, AC/DC power converter 158, switching bridge 160, capacitor bank 162, transformer 164, capacitor bank 166, switch bank 168, electric machine 170, switching bridge 172, and traction battery 174 are arranged in, and can be operated by the controller 194, in a manner similar to FIGS. 3, 4, and 5 as appropriate.

The electro-magnetic interference filter 176 is directly connected between the AC/DC power converter 158 and switch bank 160. The switch bank 178 is arranged to connect the electro-magnetic interference filter 176 directly with the traction battery 174 such that power output from the AC/DC power converter 158 may flow directly to the traction battery 174 via the electro-magnetic interference filter 176 and switch bank 178.

The rectifier 180 is magnetically coupled with the transformer 164 via a low voltage coil and common core. The rectifier 180 is connected with the auxiliary battery 182 such that power from the transformer 164 may flow through the rectifier 180 and to the auxiliary battery 182.

The rectifier 180 may be implemented as a center-tap rectifier, a full-bridge rectifier, a half-bridge rectifier, a current doubler, etc. The low voltage coil can be implemented as a center-tap coil or single coil. The rectifier 180 rectifies the voltage induced across the low voltage coil for delivering DC power to the auxiliary battery 182.

The switch bank 184 is connected between the capacitor bank 166 and switch bank 186. The switch bank 186 is connected between the switch bank 184 and isolated high voltage DC bus 188.

One switch of the switch bank 190 is connected with a power line between the electro-magnetic interference filter 154 and AC source 198 and the non-isolated high voltage DC bus 192. Another switch of the switch bank 190 is connected with a neutral line and the non-isolated high voltage DC bus 192.

The switch bank 178 electrically connects the traction battery 174 to the BCCM's intermediate DC bus. When the vehicle 196 is disconnected from the AC grid 198 or is in drive mode, all other relays, including the switch bank 168, are open. The BCCM's intermediate DC bus is energized by closing the switch bank 178. An isolated high voltage to low voltage DC/DC power converter is configured for charging the auxiliary battery 182. The transformer's primary windings and low voltage coil are energized for charging/discharging the auxiliary battery 182.

When the vehicle 196 is connected to the AC grid, the controller 194 generates commands such that the switch banks 178, 186, 190 are open, and the switch bank 168 is closed. The switch bank 156 is configured depending on grid type (e.g., single-phase, two-phase, three-phase, etc.). All transformer windings are energized to allow for bidirectional power flow between the AC grid and the traction battery 174, and between the traction battery 174 and auxiliary battery 182.

During drive mode, the inverter system controller circuit 172 is disconnected from the BCCM circuit via the switch bank 168, and the BCCM's intermediate DC bus is directly connected to the traction battery 174 via the switch bank 178.

By adding the three-phase inverter/rectifier 184 after the transformer's secondary windings, a bi-directional CLLC DC/DC converter is formed. Power can flow between the traction battery 174 and the isolated high voltage DC bus 188.

By closing switches S1, S2, S3 of the switch bank 156, three interleaved bi-directional buck/boost converters are formed using the power factor correction totem pole circuit 158. Field effect transistor FET1 can be turned ON and switch S4 closed, both of the AC/DC power converter 158, to allow the return current to flow through the neutral line. Hence, the AC side electro-magnetic interference filter 154 can be used to filter the noise generated by the switching supply.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The capacitor banks could instead be inductor banks, or capacitor and inductor banks. The symbols used to represent capacitors of the capacitor banks can thus also represent inductors of such inductor banks, or represent capacitors and inductors of such capacitor and inductor banks. The switching bridges may be n-phase inverters or n-phase rectifiers depending on topology and functionality requirements, etc. The switching bridge 122, for example, may be configured as a single phase inverter by removing one of its phase legs.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
   first and second switching bridges;
   a circuit arrangement including an AC/DC power converter, a transformer connected between the second switching bridge and AC/DC power converter, a third switching bridge connected between the AC/DC power converter and transformer, a first switch bank connected between the first switching bridge and transformer such that operation of the first switch bank selectively disconnects the first switching bridge from the circuit arrangement without disconnecting the second switching bridge from the circuit arrangement, a second switch bank connected between the AC/DC power converter and a traction battery, an electromagnetic interference filter, and a third switch bank connected between the AC/DC power converter and electromagnetic interference filter; and
   a controller programmed to, during a drive mode, configure the first and second switch banks to permit power flow from the traction battery to the second switching bridge via the transformer and configure the third switch bank to form interleaved bi-directional buck/boost converters using the AC/DC power converter.

2. The automotive power system of claim 1, wherein the controller is further programmed to, during the drive mode, operate the AC/DC power converter to permit return current to flow through a neutral line of the circuit arrangement such that the electromagnetic interference filter filters noise generated by the circuit arrangement.

3. The automotive power system of claim 1 further comprising a DC bus and a fourth switch bank connected between the circuit arrangement and DC bus.

4. The automotive power system of claim 3, wherein the controller is further programmed to, during a charge mode, configure the fourth switch bank to disconnected the DC bus from the circuit arrangement.

5. The automotive power system of claim 4, wherein the controller is further programmed to, during the charge mode, operate the circuit arrangement and first switching bridge to transfer power from an AC source to the traction battery.

6. A method for operating a traction battery, first and second switching bridges, and a circuit arrangement including an AC/DC power converter, a transformer connected between the second switching bridge and AC/DC power converter, a third switching bridge connected between the AC/DC power converter and transformer, a first switch bank connected between the first switching bridge and transformer, a second switch bank connected between the AC/DC power converter and traction battery, an electromagnetic interference filter, and a third switch bank connected between the AC/DC power converter and electromagnetic interference filter, the method comprising:
   during a drive mode, configuring the first and second switch banks to permit power flow from the traction battery to the second switching bridge via the transformer and configuring the third switch bank to form interleaved bi-directional buck/boost converters using the AC/DC power converter.

7. The method of claim 6 further comprising, during the drive mode, operating the AC/DC power converter to permit return current to flow through a neutral line of the circuit arrangement such that the electromagnetic interference filter filters noise generated by the circuit arrangement.

8. The method of claim 6 further comprising, during a charge mode, transferring power from an AC source to the traction battery via the circuit arrangement and first switching bridge.

9. A vehicle comprising:
   an electric machine;
   a traction battery;
   a first switching bridge connected between the electric machine and traction battery;
   a circuit arrangement including a second switching bridge, an AC/DC power converter, a transformer connected between the second switching bridge and AC/DC power converter, a third switching bridge connected between the AC/DC power converter and transformer, a first switch bank connected between the first switching bridge and transformer, a second switch bank connected between the AC/DC power converter and traction battery, an electromagnetic interference filter, and a third switch bank connected between the AC/DC power converter and electromagnetic interference filter; and
   a controller programmed to, during a drive mode, configure the first and second switch banks to permit power flow from the traction battery to the second switching bridge via the transformer and configure the third switch bank to form interleaved bi-directional buck/boost converters using the AC/DC power converter.

10. The vehicle of claim 9, wherein the controller is further programmed to, during the drive mode, operate the AC/DC power converter to permit return current to flow through a neutral line of the circuit arrangement such that the electromagnetic interference filter filters noise generated by the circuit arrangement.

11. The vehicle of claim 9, wherein the circuit arrangement is configured to, during a charge mode, receive power from an AC source.

12. The vehicle of claim 9 further comprising a DC bus and a fourth switch bank connected between the circuit arrangement and DC bus.

13. The vehicle of claim 12, wherein the controller is further programmed to, during a charge mode, configure the fourth switch bank to disconnected the DC bus from the circuit arrangement.

* * * * *